United States Patent [19]
Holsomback

[11] 4,154,265
[45] May 15, 1979

[54] FLUID SYSTEM NOISE SUPPRESSOR

[75] Inventor: Jesse J. Holsomback, Pearland, Tex.

[73] Assignee: Houston Elevator Service, Inc., Houston, Tex.

[21] Appl. No.: 847,085

[22] Filed: Oct. 31, 1977

[51] Int. Cl.² ............................................. F15D 1/02
[52] U.S. Cl. ...................................... 138/41; 138/37; 138/39; 181/270; 181/281
[58] Field of Search .................... 138/37, 39, 42, 41; 181/270, 275, 264, 269, 281

[56] References Cited

U.S. PATENT DOCUMENTS

| | | | |
|---|---|---|---|
| 1,877,567 | 9/1932 | Erbes | 138/37 |
| 1,891,170 | 11/1932 | Nose | 181/270 |
| 3,134,655 | 5/1964 | Boucher | 138/37 |

FOREIGN PATENT DOCUMENTS 291017  3/1929  United Kingdom ..................... 181/270

Primary Examiner—Houston S. Bell, Jr.
Attorney, Agent, or Firm—Bill B. Berryhill

[57] ABSTRACT

A noise suppressor for fluid systems may comprise: a cylindrical housing, having an inlet and an outlet, through which fluid may flow and a baffle assembly disposed in the housing providing a path for the flow of fluid whereby the flow is diverted from one side of the housing to the other as fluid flows between the inlet and outlet. A perforated plate member may also be transversely disposed in the housing between the baffle assembly and either the inlet or outlet.

8 Claims, 3 Drawing Figures

# FLUID SYSTEM NOISE SUPPRESSOR

BACKGROUND OF THE INVENTION

1. Field of the Invention

The present invention pertains to noise suppressor for fluid systems. Specifically, it pertains to a noise suppressor suitable for suppressing noise produced by hydraulic power assemblies which supply power to hydraulic elevators.

2. Description of the Prior Art

In a hydraulic elevator, a vertical hole is normally drilled at the bottom of an elevator shaft and a hydraulic piston and cylinder unit placed therein. A rod acting as a piston is disposed in the cylinder and attached at the upper end thereof to the base of the elevator car. When fluid power is supplied to the piston and cylinder unit, the piston rod is raised, causing the elevator to rise. To lower the elevator, fluid is simply allowed to exit the piston and cylinder unit, allowing the piston rod to descend as the elevator car descends.

As a rule, the power assembly for supplying pressurized fluid to the piston and cylinder unit is mounted at some accessible location and connected to the piston and cylinder unit by a hydraulic line. The power assembly conventionally includes a fluid reservoir, a hydraulic pump and a hydraulic valve for controlling fluid flow to and from the piston and cylinder unit. In addition, control apparatus is provided for controlling the operation of the pump and control valve. These items are conventionally mounted in a unitary housing so that the power assembly can be preassembled before installation to provide a compact and easily installed unit. Such a power assembly and its relationship with a hydraulic elevator is shown in my copending patent application Ser. No. 838,149.

Due to the pumping and movement of hydraulic fluids in hydraulic elevator fluid systems, a certain amount of noise is produced. While such noise may have no bearing on the operation of the overall system, it is not desirable. For this reason, most hydraulic power assemblies for operation of hydraulic elevators are provided with some sort of device for suppressing or muffling the noise created by the operation of such systems. As evidenced by the fact that there are several types of these devices, a completely satisfactory noise suppressor has not yet been developed.

SUMMARY OF THE INVENTION

The present invention provides a noise suppressor which comprises: a cylindrical housing through which the system fluid may flow, having an inlet and an outlet, and a baffle assembly disposed in the housing providing a path for the flow of the system fluid whereby the flow is diverted from one side of the housing to the other as fluid flows between the inlet and outlet. The suppressor may also include a perforated plate member transversely disposed in the housing between the baffle assembly and preferably the housing inlet.

With such a noise suppressor, the noise produced by the pumping and movement of fluids in the power assembly of the hydraulic elevator system is substantially reduced. In addition, hydraulic hammer problems may also be eliminated.

The noise suppressor of the present invention is simple and cheap to manufacture and trouble-free in operation. Many other objects and advantages of the invention will be apparent from reading the description which follows in conjunction with the accompanying drawings.

DESCRIPTION OF A PREFERRED EMBODIMENT

Figure 1:
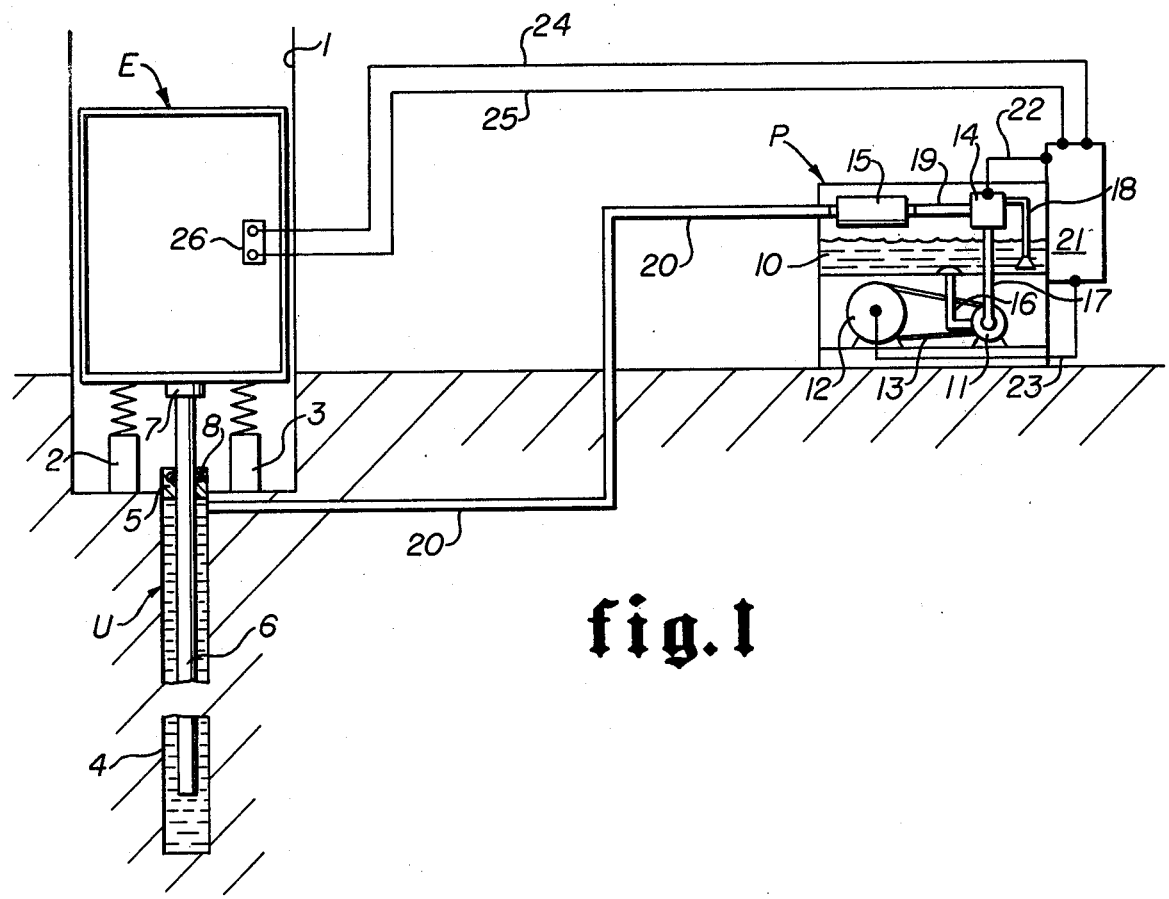
FIG. 1 is a schematic representation of a hydraulic elevator utilizing a power assembly in which is installed a noise suppressor, according to a preferred embodiment of the invention.

Referring first to FIG. 1, there is schematically represented a power assembly P for supplying the hydraulic power necessary for raising or lowering of an elevator car E. The elevator car E is mounted in a vertical elevator shaft 1 at the bottom of which is mounted shock assemblies or springs 2 and 3. Placed in a vertical hole drilled therefor at the bottom of the elevator shaft 1 is a piston and cylinder unit U. The piston and cylinder unit may comprises a cylinder 4 having a head 5 and a piston rod 6 reciprocal within the cylinder 4. At its upper end, the piston rod 6 bears against a bearing plate 7 which is attached to the elevator car E. Appropriate seals 8 are provided in the cylinder head 5 for sealing against the piston rod 6.

The power assembly P comprises a fluid reservoir 10, a pump 11 connected to an electric motor 12 by some coupling means such as a belt 13. Also provided is a control valve 14 and a noise suppressor 15, a complete description of which will follow hereafter. The suction side of the pump 11 is in fluid communication with the reservoir 10 through conduit 16. The discharge side of the pump 11 is connected to control valve 14 by conduit 17. Conduit 18 provides fluid communication between the control valve 14 and fluid reservoir 10. Conduits 19 and 20 provide, via noise suppressor 15, fluid communication between the control valve 14 and the piston and cylinder unit U.

Electric control components are mounted within a control panel 21 connected by suitable electrical conduits 22 and 23 to control valve 24 and motor 12 for controlling operation of the pump 11 and control valve 14. The control panel 21 is also connected, via suitable electrical conduits 24 and 25, to the operating controls 26 located in the elevator car E.

Upon the appropriate signal from the operator panel 26 to control panel 21, the pump 11 is actuated, taking fluid from reservoir 10 and pumping it under pressure to control valve 14 and conduits 19 and 20 to the piston cylinder unit U. As fluid is supplied under pressure to the cylinder 4, piston rod 6 is raised, consequently raising the elevator car E until the appropriate signal is supplied for indicating on what level the elevator car E is to be stopped. Until another signal is supplied, the control valve 14 will be closed preventing fluid from returning from piston and cylinder unit U and leaving the elevator car E at its raised level. Upon a subsequent signal from the operator panel 26, the control valve 14 is opened to discharge through conduit 18 allowing fluid to return from the cylinder 4 through conduits 20, 19 and 18, into the fluid reservoir 10. This then in summary describes the general operation of a hydraulic elevator and its power assembly.

Figures 2, 3:
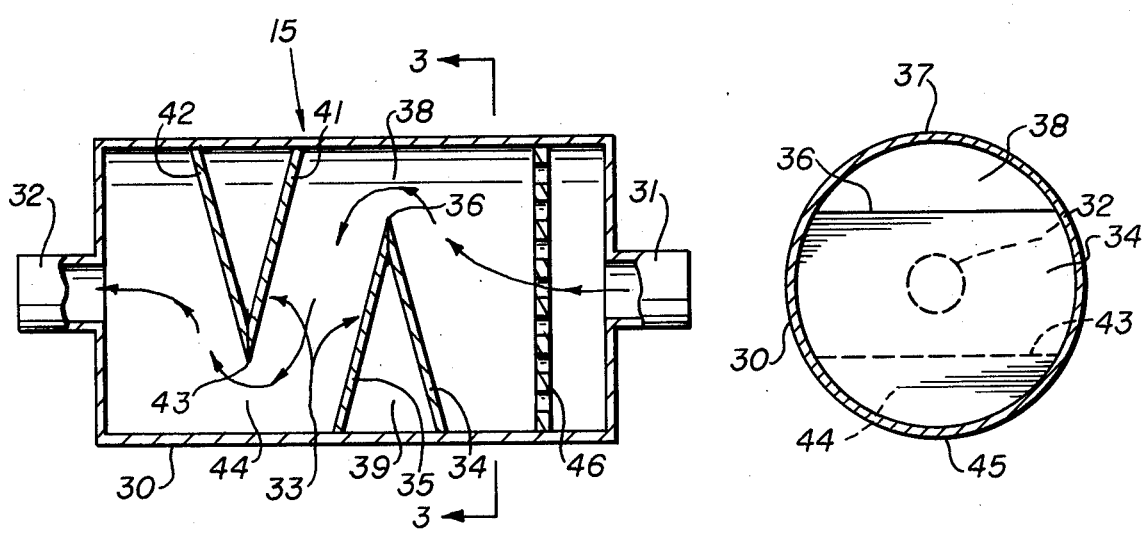
FIG. 2 is a side elevation view, in section, of a noise suppressor according to a preferred embodiment of the invention.
FIG. 3 is a cross-sectional view of the noise suppressor of FIG. 2, taken along line 3—3 of FIG. 2.

Referring now to FIGS. 2 and 3, a complete description of the noise suppressor 15 will be given. The noise suppressor 15 may include a cylindrical housing 30 having an inlet 31 at one end and an outlet 32 at the other. The inlet and outlet may be provided with any suitable means for connecting the suppressor 15 to conduits, such as 19 and 20 in FIG. 1, in the fluid system with which the suppressor is to be used. As shown, the inlet 31 and outlet 32 are simply welded to the adjacent conduits. However, they could be threaded or provided with any other suitable connection means.

A baffle assembly 33 is disposed in the housing 30 providing a path for the flow of fluid whereby the flow is diverted from one side of the housing to the other, as indicated by the flow arrows in FIG. 2, as the fluid flows between the inlet 31 and outlet 32. The baffle assembly may comprise a first plate member 34 inclined in one direction, relative to the axis of the housing 30 and a second plate member inclined in the opposite direction relative to the housing axis. Plate members 34 and 35 terminate in an apex 36 which is a chord of the cylindrical housing 30. The terminating apex or chord 36 and the circumference 37 of the cylindrical housing thereat define a first flow passage 38. The plate members 34 and 35 are joined together, such as by welding, along the chord 36 and may also be welded around their peripheries to the interior wall of the housing 30, leaving a void space 39 therebetween.

The baffle assembly 33 may also include a third plate member 41, substantially parallel to the second plate member 35, and a fourth plate member 42, substantially parallel to the first plate member 34, terminating in an apex 43 which is another chord of the cylindrical housing 30, but on a side opposite that of chord 36. A second flow passage 44 is defined by the chord 43 and the circumference 45 of the cylindrical housing 30 thereat. Thus, the second flow passage 44 is on the side of the housing 30 opposite the first flow passage 38 and is axially spaced therefrom.

Thus, the baffle assembly 33 provides a path for the flow of fluid through the noise suppressor 15 whereby the flow is diverted from one side of the housing to the other as the fluid flows between the inlet 31 and outlet 32. Specifically, this path, as generally shown by the flow arrows in FIG. 2, is along the first plate member 34, through first flow passage 38, between second and third plate members 35 and 41, through second flow passage 44, and along fourth plate member 42. This describes the path from inlet 31 to outlet 32. Of course, fluid may flow through the noise suppressor 15 in the opposite direction, i.e. from outlet 32 to inlet 31. The diverting path would be the same but in reverse sequence.

The noise suppressor 15 may also include a perforated plate member 46 transversely disposed in the housing 30 and through which all fluid passing between the inlet 31 and outlet 32 must pass. The plate member 46 may be simply made by providing circular holes or perforations of any other suitable shape in a circular plate which is welded or attached to the inner walls of cylindrical housing 30 in any suitable manner. As shown in the drawings, the plate member 46 is disposed between the inlet 31 and the baffle assembly 33. It could also be disposed between the baffle assembly 33 and the outlet 32.

The flow of fluid through the noise suppressor 15 has been described primarily as being from inlet 31 to outlet 32. However, as already mentioned, flow could just as easily be in the reverse direction. In fact, in its application with a hydraulic power assembly P, as illustrated in FIG. 1, flow would be essentially the same in both directions, normal flow when the elevator car E is being elevated, and reverse flow when the elevator car E descends. Furthermore, the noise suppressor of the present invention can be utilized with fluid systems of any type which need noise suppression or suppression of fluid hammer.

The noise suppressor of the present invention is simple and economically manufactured and easy to maintain. Most importantly, it is effective in reducing noise and fluid hammer associated with many fluid systems.

While a preferred embodiment of the invention and several variations thereof have been described herein, many variations may be made by those skilled in the art without departing from the spirit of the invention. Therefore, it is intended that the scope of the invention be limited only by the claims which follow.

I claim:

1. A noise suppressor for fluid systems comprising:
   a cylindrical housing, having an inlet and an outlet, through which fluid may flow in either direction; and
   baffle means disposed in said housing providing a path for the flow of said fluid whereby said flow is diverted from one side of said housing to the other as said fluid flows in either direction between said inlet and outlet;
   said baffle means comprising a first plate member inclined in one direction, relative to the axis of said housing, a second plate member inclined in the opposite direction, relative to said housing axis, terminating along a chord of said cylindrical housing to form a first flow passage defined by said chord and the circumference of said cylindrical housing thereat; and a third plate member, substantially parallel to said second plate member, a fourth plate member, substantially parallel to said first plate member, said third and fourth plate members terminating along another chord of said cylindrical housing to form a second flow passage, on the side of said housing opposite said first flow passage, defined by said another chord and the circumference of said cylindrical housing thereat.

2. A noise suppressor as set forth in claim 1 including a perforated plate member transversely disposed in said housing between said first plate member and said inlet and through which said fluid must pass in either direction between said inlet and said outlet.

3. A noise suppressor as set forth in claim 1 in which said path provided by the said baffle means is provided along said first plate member, through said first flow passage, between said second and third plate members, through said second flow passage and along said fourth plate member when said flow is in one direction and along said fourth plate member, through said second flow passage, between said second and third plate members, through said first passage and along said first plate member when said flow is in the opposite direction.

4. A noise suppressor as set forth in claim 1 including a perforated plate member transversely disposed in said housing between said baffle means and one of said inlet and outlet and through which said fluid must pass between said inlet and said outlet.

5. A noise suppressor for fluid systems comprising:
   a cylindrical housing, having an inlet and an outlet, through which fluid may flow;

a perforated plate member transversely disposed in said housing and through which said fluid must pass between said inlet and outlet; and baffle means disposed in said housing for diverting the flow of said fluid from one side of said housing to the other as said fluid flows between said inlet and outlet;

said baffle means comprising a first plate member inclined in one direction, relative to the axis of said housing, a second plate member inclined in the opposite direction, relative to said housing axis, terminating along a chord of said cylindrical housing to form a first flow passage defined by said chord and the circumference of said cylindrical housing thereat; and a third plate member, substantially parallel to said second plate member, a fourth plate member, substantially parallel to said first plate member, said third and fourth plate members terminating along another chord of said cylindrical housing to form a second flow passage, on the side of said housing opposite said first flow passage, defined by said another chord and the circumference of said cylindrical housing thereat.

6. A noise suppressor as set forth in claim 5 in which said perforated plate member is disposed in said housing between said inlet and said baffle means.

7. A noise suppressor as set forth in claim 1 in which said first and second plate members and said second and third plate members are joined together along said respective terminating chords and are sealingly affixed around their peripheries to the interior wall of said housing, leaving void spaces between said first and second plate members and between said third and fourth plate members.

8. A noise suppressor as set forth in claim 5 in which said first and second plate members and said second and third plate members are joined together along said respective terminating chords and are sealingly affixed around their peripheries to the interior wall of said housing, leaving void spaces between said first and second plate members and between said third and fourth plate members.

* * * * *